United States Patent [19]
Hunter, Jr.

[11] Patent Number: 5,354,240
[45] Date of Patent: Oct. 11, 1994

[54] VARIABLE TRANSMISSION

[76] Inventor: Harold A. Hunter, Jr., 336 W. Oakdale St., Mt. Airy, N.C. 27030

[21] Appl. No.: 126,309

[22] Filed: Sep. 24, 1993

Related U.S. Application Data

[63] Continuation-in-part of Ser. No. 9,739, Jan. 27, 1993.

[51] Int. Cl.⁵ .............................................. F16H 9/26
[52] U.S. Cl. ........................................ 474/57; 474/69
[58] Field of Search ................ 474/69, 50, 57, 56, 474/49, 47; 74/63, 594.2

[56] References Cited

U.S. PATENT DOCUMENTS

| | | | |
|---|---|---|---|
| 1,279,271 | 12/1918 | Stockl | 446/173 |
| 1,626,701 | 5/1927 | Sleeper | 474/50 |
| 3,383,931 | 5/1968 | Patterson | 74/63 |
| 3,722,305 | 3/1973 | Walters | 74/63 X |
| 3,956,944 | 5/1976 | Tompkins | 474/50 |
| 4,697,469 | 10/1987 | Takamiya et al. | 74/63 X |
| 4,712,450 | 12/1987 | Takamiya et al. | 74/63 X |
| 4,800,768 | 1/1989 | Kazuta | 74/63 |
| 4,892,506 | 1/1990 | Wen | 474/49 |

Primary Examiner—Roger J. Schoeppel

[57] ABSTRACT

A variable speed transmission system usable with the standard rear axle of most bicycles which utilizes a rotating chain sprocket engaging an endless chain for receiving an input torque and transmitting an output torque. A shifter device includes a stationary shifter ring, a moveable shifter plate, and an appropriate control mechanism for selectively displacing the shifter plate with respect to the shifter ring and sprocket. An appropriate apparatus means is utilized to selectively displace the longitudinal axis of the rear axle with respect to the axis of the shifter ring and axis of the sprocket to vary the torque transmission ratio. The drive apparatus can include a plurality of drive arms secured to and moveable with a clutch associated with the rear axle which are operably secured to the sprocket or a groove plate adjacent the sprocket and secured to the rear axle having a plurality of grooves operable with a drive ring affixed to the sprocket, and having a slider connecting the drive ring and groove plate.

13 Claims, 4 Drawing Sheets

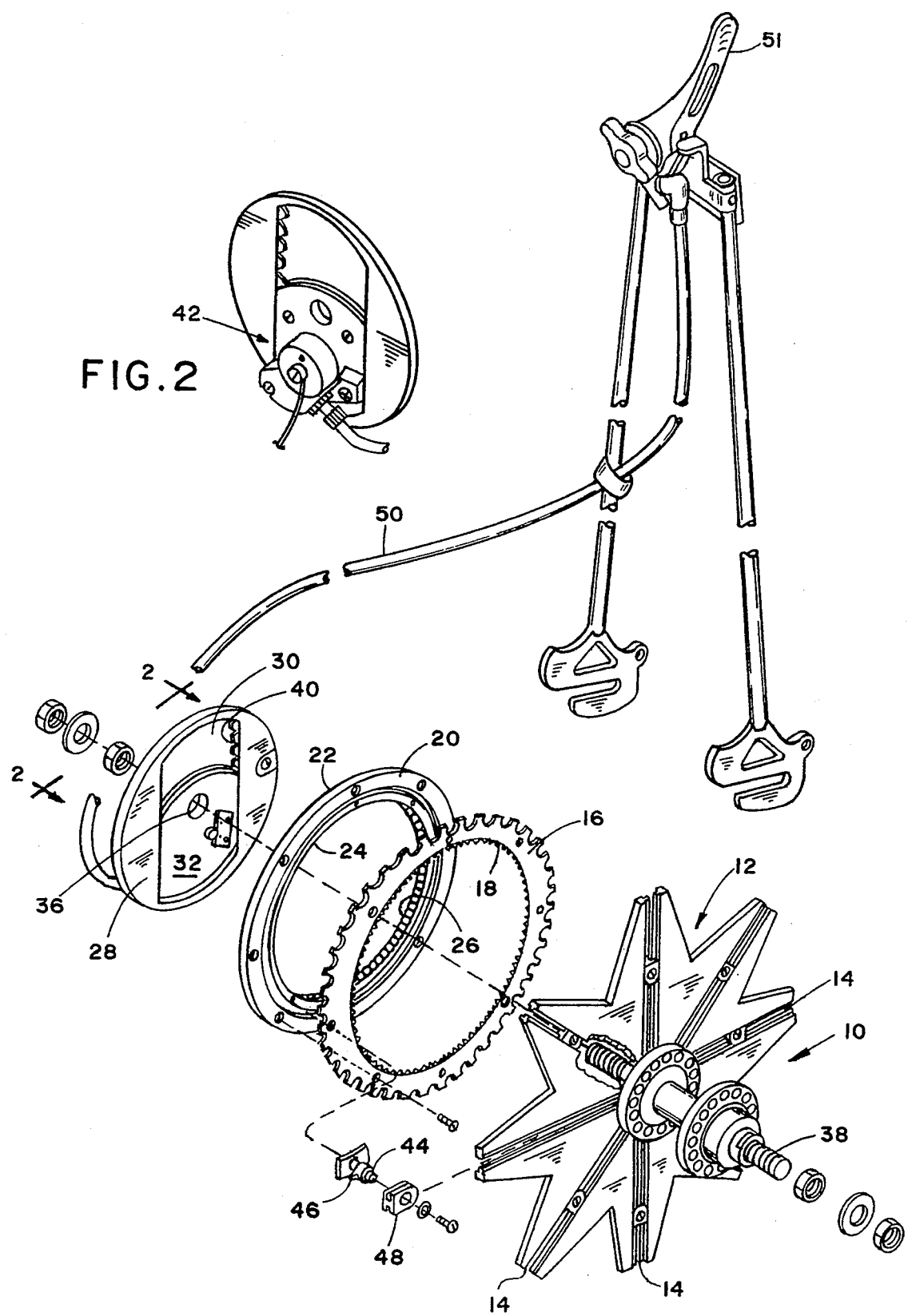

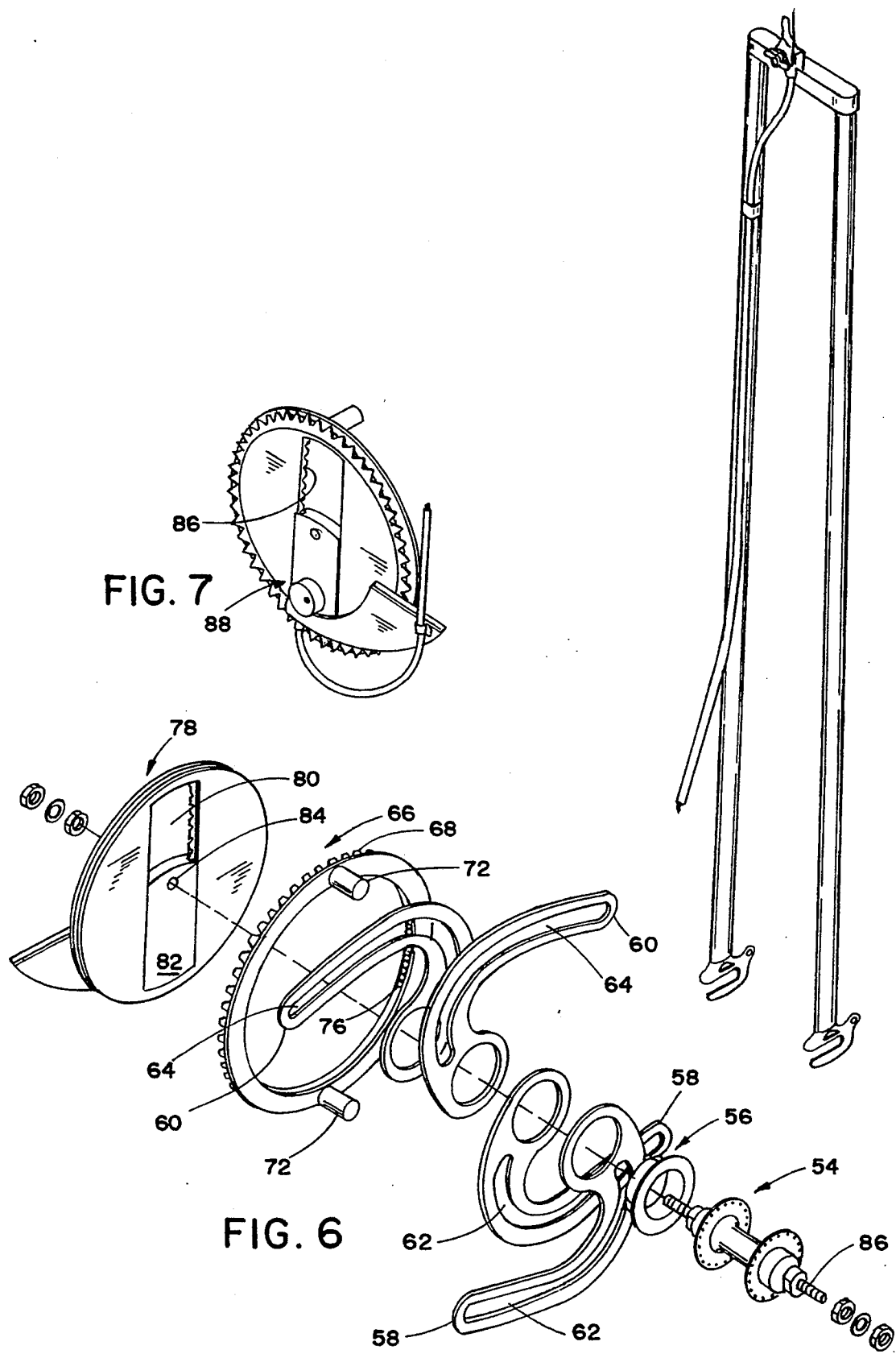

VARIABLE TRANSMISSION

This application is a continuation-in-part of application Ser. No. 08/009,739 filed Jan. 27, 1993.

BACKGROUND OF THE INVENTION

1. Field of the Invention

The present invention relates to a variable speed transmission system and more particularly to a system wherein the torque transmission ratio between the input torque and the output torque is changed by eccentrically offsetting the sprocket from the rear axle.

2. Description of the Prior Art

Numerous variable transmission systems having pulleys with varying diameters are well known such as those shown in U.S. Pat. No. 1,626,701 (Sleeper) and U.S. Pat. No. 1,279,271 (Sockl). The devices shown in these patents contain variable pulleys associated with belt drive power transmission systems.

A different type of system is shown in U.S. Pat. No. 3,956,944 which discloses a variable ratio chain sprocket wherein a plurality of chain engaging segments are slidably affixed first between a pair of discs and are constrained to move in a radial direction with respect thereto. There are, however, variables in this type of construction that make it difficult to precisely adjust the transmission and to avoid excessive wear.

OBJECTIVES AND SUMMARY OF THE INVENTION

It is a primary objective of the present invention to provide a new and improved variable transmission for bicycles and related vehicles which has all of the advantages of prior art assemblies and none of the disadvantages.

It is another objective of the present invention to provide a new and improved variable transmission of the type described which will fit the rear axle of the majority of standard sized bicycles.

It is yet another objective of the present invention to provide a new and improved variable transmission of the type described which utilizes a simple force-displacing mechanism to eccentrically shift the axis of the rear axle from the sprocket to achieve varying transmission ratios.

Yet still another objective of the present invention to provide alternative drive means that will effectively transmit the input torque from the sprocket to the rear axle through a range of torque transmission ratios.

The present invention is a new and improved variable transmission system for bicycles and related vehicles utilizing a standard rear axle and rotating chain sprocket engaging an endless chain that receives an input torque and transmits an output torque. The system includes a shifter ring, a shifter plate moveable with respect to the ring and sprocket, an appropriately selected drive mechanism operably connected to the sprocket and rear axle, and an appropriate device to displace the shifter plate whereby the shifter ring and sprocket are eccentrically offset from the rear axle to vary the torque transmission ratio. Alternative embodiments of an appropriate drive mechanism are included.

Thus there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In this respect, it is to be understood that the invention is not limited in its application to the details of construction and to the arrangement of the components set forth in the following description or illustrated in the drawings. The invention is capable of other embodiments and of being practiced and carried out in various ways. It is also to be understood that the phraseology and terminology employed herein are for the purpose of description and should not be regarded as limiting. Those skilled in the art will appreciate that the concept upon which this disclosure is based may be readily utilized as a basis for the designing of other structures, methods and systems for carrying out the several purposes of the present invention. It is important, therefore, that the claims be regarded as including such equivalent constructions insofar as they do not depart from the spirit and scope of the present invention.

Thus, the enumerated objectives and others identified hereinafter along with the various features of novelty which characterize the invention, are pointed out with particularity in the claims annexed to and forming a part of this disclosure. For a better understanding of the invention, its operating advantages and the specific objectives attained by its use, reference is made to the accompanying drawings forming a part of the specification in which like characters of reference designate like parts throughout the several views.

BRIEF DESCRIPTION OF THE DRAWINGS

This invention will be better understood and objectives other than those set forth above will become more apparent when consideration is given to the following detailed description. Such description makes reference to the annexed drawings wherein:

FIG. 1 is a perspective, exploded and enlarged view of the variable transmission assembly comprising the present invention utilizing a first embodiment of a drive mechanism and its relationship to a standard bicycle rear axle;

FIG. 2 is a perspective and isolated view of the shifter ring and plate viewed from the side opposite the side shown in FIG. 1;

FIG. 6 is a perspective, exploded and enlarged view of the variable transmission assembly comprising the present invention and its relationship to a standard bicycle rear axle illustrating an alternative embodiment of a drive mechanism;

FIG. 7 is a schematic plan view of the positioning of the drive arms in the alternative embodiment of the drive mechanism shown in FIG. 6 at 0, 180 and 360 degrees when the transmission ratio is 1:1;

DETAILED DESCRIPTION OF THE PREFERRED EMBODIMENTS

Figures 3, 4, 5:
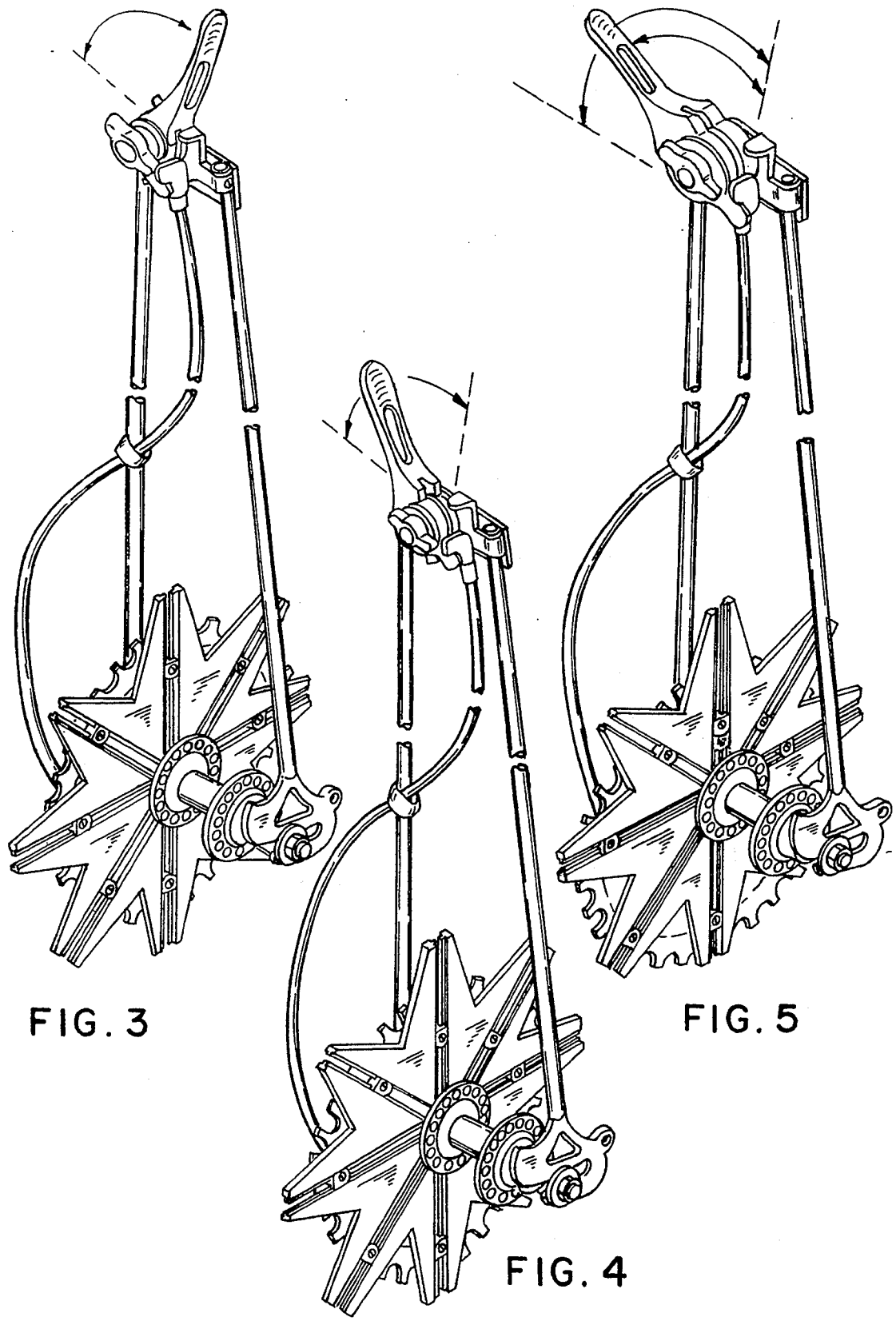
FIG. 3 is a partial view of a bicycle chassis for supporting the rear axle and variable transmission system of the present invention and the operating lever to produce a varying transmission ratio wherein the transmission ratio is 1:1.
FIG. 4 illustrates the mechanism of FIG. 3 wherein the transmission ratio is greater than 1:1 and less than 1:2.4.
FIG. 5 illustrates the mechanism of FIGS. 3 and 4 wherein the transmission ratio is 1:2.4.
Figure 8:
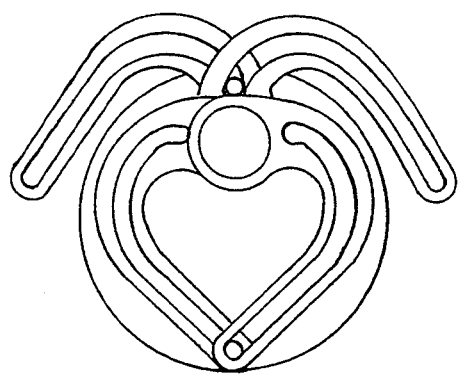
FIG. 8 is a schematic plan view of the positioning of the drive arms in the drive mechanism of FIG. 6 when the transmission is 1:1 at 90 degrees and 270 degrees.
Figure 9:
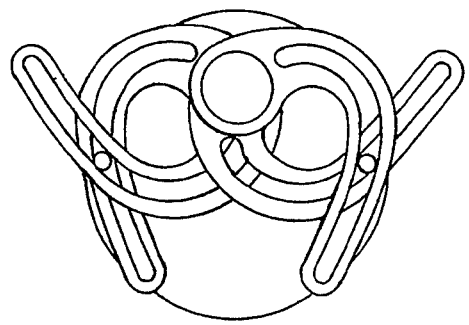
FIG. 9 is a schematic plan view of the positioning of the drive arms in the drive mechanism of FIG. 6 when the transmission ratio is 1:1.8 at 0, 180 and 360 degrees.
Figure 10:
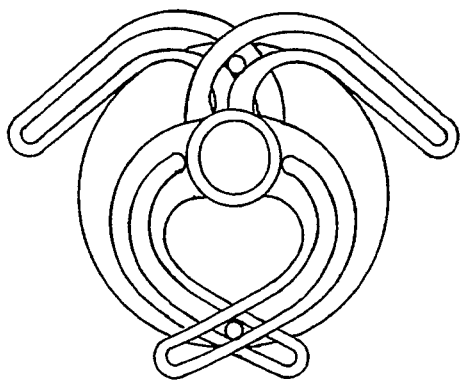
FIG. 10 is a schematic plan view of the positioning of the drive arms in the drive mechanism of FIG. 6 when the transmission ratio 1:1.8 at 90 degrees and 270 degrees.
Figure 11:
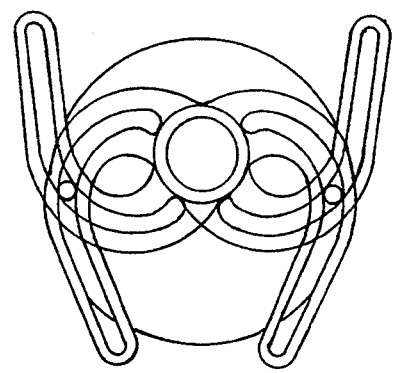
FIG. 11 is a schematic plan view of the positioning of the drive arms in the drive mechanism of FIG. 6 when the transmission ratio is 1:2.4 at 0, 180 and 360 degrees.
Figure 12:
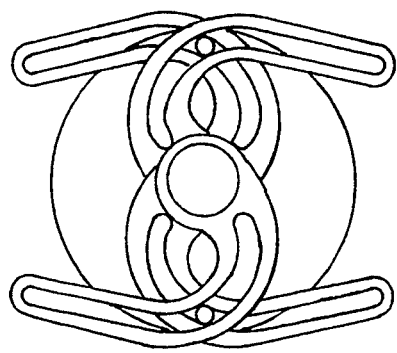
FIG. 12 is a schematic plan view of the positioning of the drive arms in the drive mechanism of FIG. 6 when the transmission ratio is 1:2.4 at 90 degrees and 270 degrees.

Referring now to the drawings and particularly to FIG. 1, a standard bicycle rear axle assembly is shown generally as 10 and has mounted thereon a groove plate 12 that carries a plurality of radially formed grooves 14. Groove plate 12 fastens securely to axle assembly 10 and has no relative movement with respect thereto.

A sprocket 16 carries on its inner edge a ring gear 18. Sprocket 16 is secured to a drive ring 20 which has an outer clutch ring 22 and an inner clutch ring 24 as shown. A plurality of ball bearings 26 lines the inner clutch ring 24 to provide for movement with a component part that will subsequently be described.

A circular shifter ring 28 accommodates within a diametrical slot or opening 30 a moveable shifter plate 32 configured to move within slot 38. Shifter plate 32 has an aperture 36 in which rear axle 38 of axle assembly 10 is fixedly disposed. A rack gear 40 is formed on one side of opening 30 to engage a rotary gear shown generally as 42 in FIG. 2 so that rotary motion of rotary gear 42 will move shifter plate 32 within opening 30 along gear rack 40.

Sprocket 16, drive ring 20 and shifter ring 28 are all fixedly connected by screws or other appropriate means and therefore function singularly as a unit. These components are movably connected to groove plate 12 by means of a plurality of posts 44, pawls 46, and groove plate sliders 48.

A force-sensitive mechanism, for example operating cable 50, can be used to selectively displace shifter plate 30 along rack gear 40 so as to eccentrically offset shifter ring 28, drive ring 20 and sprocket 16 from axis 38 and thereby selectively vary the transmission ratio. Stability is achieved once eccentricity is selected by the groove plate sliders 48 moving within grooves 14 as seen in FIG. 1. Cable 50 is actuated by any appropriate means such as, for example, lever 51 shown in FIG. 3.

FIGS. 3-5 illustrate the variable transmission assembly of the present invention in a neutral or 1:1 torque transmission ratio, a maximum torque transmission displacement ratio of 1:2.4, and in a torque transmission ratio between these two outer limits.

An alternative drive mechanism is operationally disclosed best in FIG. 6 and includes axle assembly 54 to which is fixedly secured a unidirectional clutch 56 that drives a plurality of drive arms 58, 60. These drive arms function in pairs 58, 58 and 60, 60, are arcuately shaped, and have extended openings 62, 64, the function of which will be subsequently described.

A sprocket 66 has chain engaging teeth 68 along its outer periphery and seated bearings 76 along its inner periphery. Oppositely disposed posts 72 are slidably received within elongated driving grooves 62, 64 of drive arms 58, 60 to move therein and rotate the drive arms which transmit rotational force to bearing 56 and axle 54. The positioning of drive arms 58, 60 through various ratios and at various circular locations are shown in FIGS. 8-13. A shifter ring shown generally as 78 is identical to the shifter ring 28 of the first embodiment discussed previously. It has an opening 80 in which is positioned a moveable shifter plate 82 that has an aperture 84 in which axle 86 is fixedly disposed. A rack gear 86 is formed on one side of opening 80 to engage a rotary gear shown generally as 88 so that rotary motion of rotary gear 88 will move shifter plate 82 within opening 80 along rack gear 86.

A force-sensitive mechanism such as the cable shown in FIG. 1 is appropriate for selectively activating shifter plate 82.

Thus there has been illustrated the variable transmission assembly comprising the present invention utilizing alternative drive mechanisms. It is to be realized that the optimum dimensional relationship for the parts of the invention to include variations in size, materials, shape, form, function and manner of operation, assembly and use are deemed readily apparent and obvious to one skilled in the art. All equivalent relationships to those illustrated in the drawings and described in the specification are intended to be encompassed herein. Therefore, the foregoing is considered as illustrative only of the principles of the invention. Since numerous modifications and changes will readily occur to those skilled in the art, it is not desired to limit the invention to the exact construction and operation shown and described. All suitable modifications and equivalents that fall within the scope of the appended claims are deemed within the present inventive concept.

What is claimed is:

1. In a power transmission system having a standard rear axle and a rotatable chain sprocket engaging an endless chain for receiving an input torque and transmitting an output torque, an improvement for varying the torque transmission ratio comprising: shifter means having a circular shifter ring with a diametrical slot and shifter plate means including a shifter plate configured for slidable movement within the diametrical slot and movable with respect to the sprocket; means selectively displacing the shifter plate within the diametrical slot and with respect to the sprocket whereby the shifter ring and sprocket are eccentrically offset from the rear axle to vary the torque transmission ratio.

2. The system as claimed in claim 1 wherein the drive means includes a unidirectional clutch associated with the rear axle, a plurality of arcuate drive arms having driving grooves formed therein secured to and movable with the clutch, and posts associated with the sprocket operably engaging the drive arms driving grooves to transmit the rotational movement of the sprocket to the drive arms, clutch and rear axle.

3. The system as claimed in claim 1 wherein the drive means includes a groove plate adjacent the sprocket having a plurality of grooves therein, a drive ring affixed to the sprocket having inner and outer clutch rings, means movably connecting the drive ring and groove plate to transmit the rotational movement of the sprocket to the groove plate and rear axle.

4. The system as claimed in claim 1 wherein the torque transmission ratio is selectively variable within a range of from 1:1 to 1:2.4.

5. The system as claimed in claim 4 wherein movement of the shifter plate displaces the rear axle with respect to the shifter plate and sprocket to vary the torque transmission ratio.

6. The system as claimed in claim 5 wherein the shifter plate displacing means includes gear means responsive to an applied force.

7. The system as claimed in claim 6 wherein the drive means includes a unidirectional clutch associated with the rear axle, a plurality of arcuate drive arms having driving grooves formed therein secured to and movable with the clutch, and posts associated with the sprocket operably engaging the drive arms driving grooves to transmit the rotational movement of the sprocket to the drive arms, clutch and rear axle.

8. The system as claimed in claim 6 wherein the drive means includes a grove plate adjacent the sprocket having a plurality of grooves therein, a drive ring affixed to the sprocket having inner and outer clutch rings, means movably connecting the drive ring and groove plate to transmit the rotational moment of the sprocket to the groove plate and rear axle.

9. The system as claimed in claim 6 wherein the force is applied through a lever-actuated control cable.

10. The system as claimed in claim 9 wherein the drive means includes a unidirectional clutch associated with the rear axle, a plurality of arcuate drive arms having driving grooves formed therein secured to and movable with the clutch, and posts associated with the sprocket operably engaging the drive arms driving grooves to transmit the rotational movement of the sprocket to the drive arms, clutch and rear axle.

11. The system as claimed in claim 9 wherein the gear means includes a rack gear and a rotary gear cooperating with the rack gear upon application of the force to move the shifter plate along the rack gear within the diametrical slot and thereby eccentrically displace the rear axle from the shifter ring and sprocket.

12. The system as claimed in claim 11 wherein the drive means includes a unidirectional clutch associated with the rear axle, a plurality of arcuate drive arms having driving grooves formed therein secured to and movable with the clutch, and posts associated with the sprocket operably engaging the drive arms driving grooves to transmit the rotational movement of the sprocket to the drive arms, clutch and rear axle.

13. The system as claimed in claim 11 wherein the drive means includes a groove plate adjacent the sprocket having a plurality of grooves therein, a drive ring affixed to the sprocket having inner and outer clutch rings, means movably connecting the drive ring and groove plate to transmit the rotational movement of the sprocket to the groove plate and rear axle.

* * * * *